(12) United States Patent
Shoulders

(10) Patent No.: US 6,550,258 B1
(45) Date of Patent: Apr. 22, 2003

(54) PRE-START BEARING LUBRICATION FOR REFRIGERATION SYSTEM COMPRESSOR

(75) Inventor: Stephen L. Shoulders, Baldwinsville, NY (US)

(73) Assignee: Carrier Corporation, Syracuse, NY (US)

(*) Notice: Subject to any disclaimer, the term of this patent is extended or adjusted under 35 U.S.C. 154(b) by 460 days.

(21) Appl. No.: 09/718,216

(22) Filed: Nov. 22, 2000

(51) Int. Cl.$^7$ ............................................... F25B 43/02
(52) U.S. Cl. ............................................. 62/84; 62/472
(58) Field of Search ..................................... 62/84, 472

(56) References Cited

U.S. PATENT DOCUMENTS

| | | | |
|---|---|---|---|
| 3,299,655 A | * | 1/1967 | Rayner et al. ............... 62/469 |
| 4,478,050 A | * | 10/1984 | DiCarlo et al. .............. 62/193 |
| 5,199,271 A | * | 4/1993 | Ewer ............................ 62/84 |
| 6,010,315 A | * | 1/2000 | Kishimoto et al. ........... 62/193 |
| 6,116,046 A | * | 9/2000 | Leaver et al. ................. 62/84 |
| 6,182,467 B1 | * | 2/2001 | Zhong et al. ................. 62/470 |
| 6,216,474 B1 | * | 4/2001 | Sishtla ........................... 62/84 |

* cited by examiner

Primary Examiner—William E. Tapolcai

(57) ABSTRACT

At or just prior to shut-down, or at least prior to a significant pressure equalization in a refrigeration system, a vessel containing pressurized oil or a pressurized oil-rich oil-refrigerant solution, possibly in combination with some refrigerant gas is isolated from the rest of the refrigeration system and is then maintained in a pressurized state while the refrigeration system is not operating. Preliminary to start up of the refrigeration system, the pressurized oil and refrigerant gas or oil-rich oil-refrigerant solution, is placed in fluid communication with bearings and any other components requiring pre-start lubrication. Pre-start lubrication then results as oil flows to bearings and possibly other components due to the pressure difference between the vessel containing oil and the regions to be lubricated.

9 Claims, 2 Drawing Sheets

PRE-START BEARING LUBRICATION FOR REFRIGERATION SYSTEM COMPRESSOR

BACKGROUND OF THE INVENTION

Some components of refrigeration compressors are supported by bearings. To achieve reliable operation for long periods of time, bearings require lubrication by a lubricant with adequate viscosity. In a refrigeration system, this is provided by the use of a suitable oil. Oils typically used in refrigeration systems form solutions with refrigerants. During long periods of non-operation, refrigerant will tend to move into solution with the oil, thereby severely diluting residual oil in the bearings and any other components requiring lubrication as well as oil stored in the oil reservoir. Long periods of compressor non-operation can also cause oil to be drained from the bearings altogether, resulting in no bearing lubrication at all upon start up.

Two methods are known for countering dilution of oil in the oil reservoir during periods of non-operation. In one method, all flow lines connected to the reservoir are closed via automatic control of solenoid-actuated valves. In this manner, substantial migration of refrigerant from the system to the oil reservoir, and subsequently into solution with the oil, is prevented. The other method uses an electric heater to heat the oil in the oil reservoir, thereby raising its temperature. It is the nature of the oil-refrigerant solubility relationship that increasing temperature causes decreasing refrigerant concentration in the oil-refrigerant solution.

By use of at least one of these methods, oil of adequate viscosity can be maintained in the reservoir. However, after long periods of non-operation, oil can be completely washed out from the bearings or, if some residual oil still remains in the bearings and other components, it will still be severely diluted by refrigerant migration. If the compressor is started after such a period, the bearings or other components will operate for some period of time with no lubricant, or lubricant of insufficient viscosity, causing metal-to-metal contact between parts. This can result in wear, ultimately shortening the useful life of the compressor. Additionally, in some compressor refrigeration systems, pressure differences may be used to develop lubrication flows. In such systems some time may be required after start up to develop pressure differences adequate for establishing lubrication flows. During this time, residual oil in the bearings and other components may be depleted if the amount is too little, thereby resulting in wear.

Such dilution by refrigerant of residual oil in bearings and other components or depletion of residual oil before or shortly after start up can be countered by lubricating the bearings and other components prior to start of operation with oil of adequate viscosity supplied from the oil reservoir, the adequate viscosity having been developed by any means including the two methods described above. One method of accomplishing pre-start lubrication is by use of a positive displacement pump (with suitable piping) which is activated prior to start up, thereby drawing lubricant from the oil reservoir and delivering it to the bearings and other components. A positive displacement pump suitable for this purpose adds its own reliability risk as well as substantial cost.

SUMMARY OF THE INVENTION

Prior to shut-down, pressurized oil, or oil-rich oil-refrigerant solution, possibly with some refrigerant gas, is isolated from the rest of the refrigeration system. The isolated oil, being at pressures developed during operation, is at a pressure that is higher than the pressure existing in the bearing cavities and other components at the time of start up and is maintained at this higher pressure throughout the period of shut-down via application of heat using heaters. Maintenance of the pressure level may not be exact. Some further elevation of pressure may occur or some decrease in pressure may occur if the initial pressure level exceeds that which is required. Preliminary to restarting the refrigeration system, the state of isolation of this oil is ended by placing the oil in fluid communication with bearings and possibly other components to be lubricated.

Flow of oil results by virtue of its pressure being higher than the pressure at the bearings and other components, thereby accomplishing pre-start lubrication.

It is an object of this invention to provide lubrication prior to start up without the use of a positive displacement pump.

It is another object of this invention to provide a refrigeration screw compressor system with high reliability and long life by avoiding failure of a positive displacement pre-start lubrication pump and by eliminating component failure modes due to start up with lubrication of insufficient viscosity or due to running with an insufficient amount of lubrication during a period of time just after start up but before adequate lubrication flow is established.

It is a further object of this invention to provide a method and apparatus for lubrication delivery prior to start up that is compatible with the normal operation of the lubrication system. These objects, and others as will become apparent hereinafter, are accomplished by the present invention.

Basically, at or just prior to shut-down, or at least prior to a significant pressure equalization in a refrigeration system, a vessel containing pressurized oil or a pressurized oil-rich oil-refrigerant solution, possibly in combination with some refrigerant gas, is isolated from the rest of the refrigeration system and is then maintained in a pressurized state while the refrigeration system is not operating. Preliminary to start up of the refrigeration system, the pressurized oil and refrigerant gas or oil-rich oil-refrigerant solution, is placed in fluid communication with the bearings and any other components requiring pre-start lubrication. Pre-start lubrication then results as oil flows to the bearings and possibly other components due to the pressure difference between the vessel containing oil and the regions to be lubricated.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
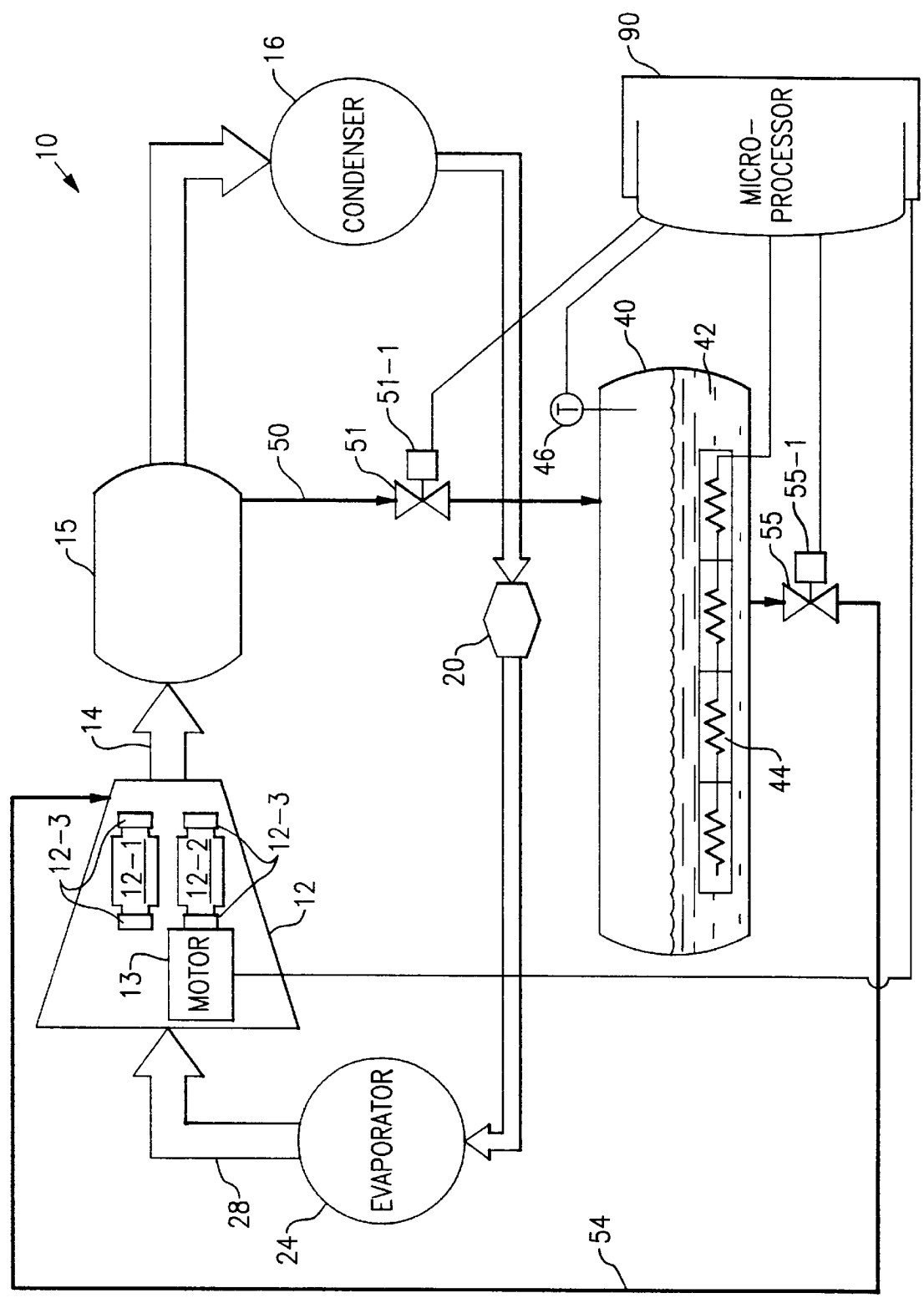
FIG. 1 is a schematic representation of a refrigeration system employing a first embodiment of the present invention.

In FIG. 1, the numeral 10 generally designates a refrigeration system. Refrigeration system 10 includes a positive displacement compressor 12 which is illustrated as a screw compressor having screw rotors 12-1 and 12-2 which are supported at their ends by a plurality of roller bearings 12-3. Refrigeration system 10 includes a fluid circuit serially including screw compressor 12, discharge line 14, oil separator 15, condenser 16, expansion device 20, evaporator 24, and suction line 28. Screw compressor 12 is driven by motor 13 under the control of microprocessor 90. Compressor lubrication systems can vary somewhat in their layout and working function. As illustrated, oil reservoir 40, which may or may not be the only oil reservoir in the refrigeration system, is the component of primary interest. Oil reservoir 40 contains oil and refrigerant gas, or an oil-rich oil-refrigerant mixture possibly in combination with refrigerant gas, with the liquid portion labeled 42, of which at least a portion is used for pre-start lubrication of the bearings 12-3 and possibly other components of compressor 12. Contents of reservoir 40, including oil 42, are heated by electrical heater 44 under the control of microprocessor 90 responsive to the temperature and/or pressure in oil reservoir 40 with temperature sensor 46 being illustrated.

Oil reservoir 40 is connected to oil separator 15 via oil flow line 50 containing solenoid valve 51, which is controlled by microprocessor 90 through solenoid 51-1. Oil reservoir 40 is connected to compressor 12 via lubricant feed line 54 containing solenoid valve 55, which is controlled by microprocessor 90 through solenoid 55-1.

In operation of refrigeration system 10, gaseous refrigerant is drawn into compressor 12 via suction line 28 and compressed with the resultant, hot, high pressure refrigerant gas being supplied via discharge line 14 to oil separator 15 where a substantial amount of oil mist entrained in the hot, high pressure refrigerant gas is separated out and collected. Hot, high pressure gas then passes to condenser 16. In condenser 16, the gaseous refrigerant condenses as it gives up heat due to heat transfer via air, water or brine-cooled heat exchangers (not shown). The condensed refrigerant passes through expansion device 20 thereby undergoing a pressure drop and partially flashing as it passes into evaporator 24. In evaporator 24, the remaining liquid refrigerant evaporates due to heat transfer via air, water or brine-cooled heat exchangers (not shown). The gaseous refrigerant is then supplied via suction line 28 to compressor 12 to complete the cycle. During operation, as oil is separated from discharging gaseous refrigerant by oil separator 15, at least some of the separated oil passes to oil reservoir 40 through oil flow line 50, preferably by action of gravity, since valve 51 is open during operation under control of microprocessor 90. As oil reservoir 40 is in fluid communication with oil separator 15 during operation, and oil separator 15 is in fluid communication with discharge line 14, the fluid pressure of oil 42 in oil reservoir 40 is essentially the same as the fluid pressure of the hot, high pressure refrigerant gas passing through discharge line 14 during operation. By design of compressor 12, this pressure is substantially higher during operation than fluid pressure in regions requiring lubrication, such as bearings 12-3, which are typically at a fluid pressure much closer to that of evaporator 24. By virtue of this pressure difference, flow of some oil 42 develops, passing into lubricant feed line 54 since valve 55 is open during operation under control of microprocessor 90. Since lubricant feed line 54 is connected to regions to be lubricated such as bearings 12-3, lubrication during operation is thereby accomplished. By design of compressor 12, the lubricant, after passing through lubricated parts such as bearings 12-3, enters gaseous refrigerant undergoing compression in compressor 12 and subsequently is entrained as oil mist in the gaseous refrigerant which, under action of compressor 12, becomes hot, high pressure gas in discharge line 14. Now, when microprocessor 90 calls for the end of operation of compressor 12 in response to either sensed parameters or manual input, just prior to interrupting power to motor 13 of compressor 12 or at least before substantial equalization of fluid pressure between oil reservoir 40 and low pressure regions such as evaporator 24, valve 55 in lubricant feed line 54 is closed under control of microprocessor 90, followed quickly by closing of valve 51 in oil flow line 50. As these are the only two fluid lines connected to oil reservoir 40, reservoir 40 is effectively isolated from the rest of the system at a time when the fluid pressure of its contents 42 is generally higher than the fluid pressure that will exist in the remaining portions of system 10 after pressure equalization occurs during the ensuing period of shut-down. It is the thermodynamic nature of refrigerant gas and oil-refrigerant solutions that a reduction in temperature will generally result in a corresponding reduction in pressure and an increase in temperature will generally result in a corresponding increase in pressure. During a period of non-operation, the temperature of the contents of oil reservoir 40 may diminish due to heat transfer with the surroundings. To counter this, in the event that such a pressure drop would be substantial enough to hinder effective pre-start lubrication, heater 44 under control of microprocessor 90 is used. When the temperature of reservoir 40, as sensed by temperature sensor 46, falls below a pre-selected value, microprocessor 90 energizes heater 44 and maintains power to heater 44 until such time as the temperature of reservoir 40 rises above a pre-selected value. The heating of the oil and refrigerant gas or the oil-rich refrigerant solution 42 in oil reservoir 40 results in the heating of the entire contents of reservoir 40 and vaporizes refrigerant out of the oil-refrigerant solution 42. The addition of heat, when called for by microprocessor 90, in combination with the fluid isolation of the contents of reservoir 40 by virtue of the closed states of valves 55 and 51 results in the maintenance of fluid pressure in reservoir 40 above the fluid pressure that exists in the remainder of the system and particularly in regions of compressor 12 to be pre-start lubricated such as bearings 12-3.

When microprocessor 90 recognizes a need for starting operation based on either sensed parameters or manual input, prior to energizing compressor 12, valve 55 in lubricant feed line 54 is opened under control of microprocessor 90. This places contents 42 of oil reservoir 40 in fluid communication with regions to be lubricated such as bearings 12-3. By virtue of the fluid pressure of the contents 42 being higher than the pressure in regions such as bearing 12-3, flow of some portion of contents 42 occurs from oil reservoir 40 through oil feed line 54 to bearings 12-3, thereby accomplishing pre-start lubrication. After a pre-selected time period, sufficient to allow an adequate amount of pre-start lubrication flow to occur, microprocessor 90 then energizes motor 13 of compressor 12 and opens valve 51 in line 50, thereby starting operation of system 10 and returning it to its normal operating configuration. The pre-selected values of temperature, upon which the actions of microprocessor 90 are based, are determined by knowledge of thermodynamic properties or by experiment such that the corresponding fluid pressure in reservoir 40 will be maintained at values sufficient to cause flow through oil feed line 54 when valve 55 is opened. In fact, temperature sensor 46 could be replaced with a pressure sensor. More precise control actions could also be provided by supplementing temperature sensor 46 with another temperature sensor located in another region of the system, for example in area of evaporator 24 or compressor bearings 12-3. Then, control could be based on a temperature difference, suitably selected to ensure a corresponding pressure difference of adequate value. In a similar fashion, the two temperature sensors could be replaced with two pressure sensors. In all cases, the intent is to provide control means whereby the fluid pressure difference between contents 42 of oil reservoir 40 and regions to be lubricated such as compressor bearings 12-3 can be maintained at a level sufficient to cause flow in oil feed line 54 when valve 55 is opened. The pressure difference depends on such things as the elevation of the highest portion of oil feed line 54 and/or bearings 12-3 relative to the elevation of oil reservoir 40, the density of contents 42, the flow resistances of oil feed line 54, valve 55, when open, and internal passages in compressor 12 fluidly connecting oil feed line 54 with bearings 12-3 and any other components to be lubricated, as well as the internal volumes of oil reservoir 40 and oil feed line 54. While approximate calculations can be made to determine the pressure difference required to ensure flow of oil 42 from reservoir 40 to bearings 12-3 and other components, experimentation may be required to accurately establish the necessary pre-selected values of control temperatures (or pressures) upon which actions of microprocessor 90 to energize or de-energize heater 44 are based.

Figure 2:
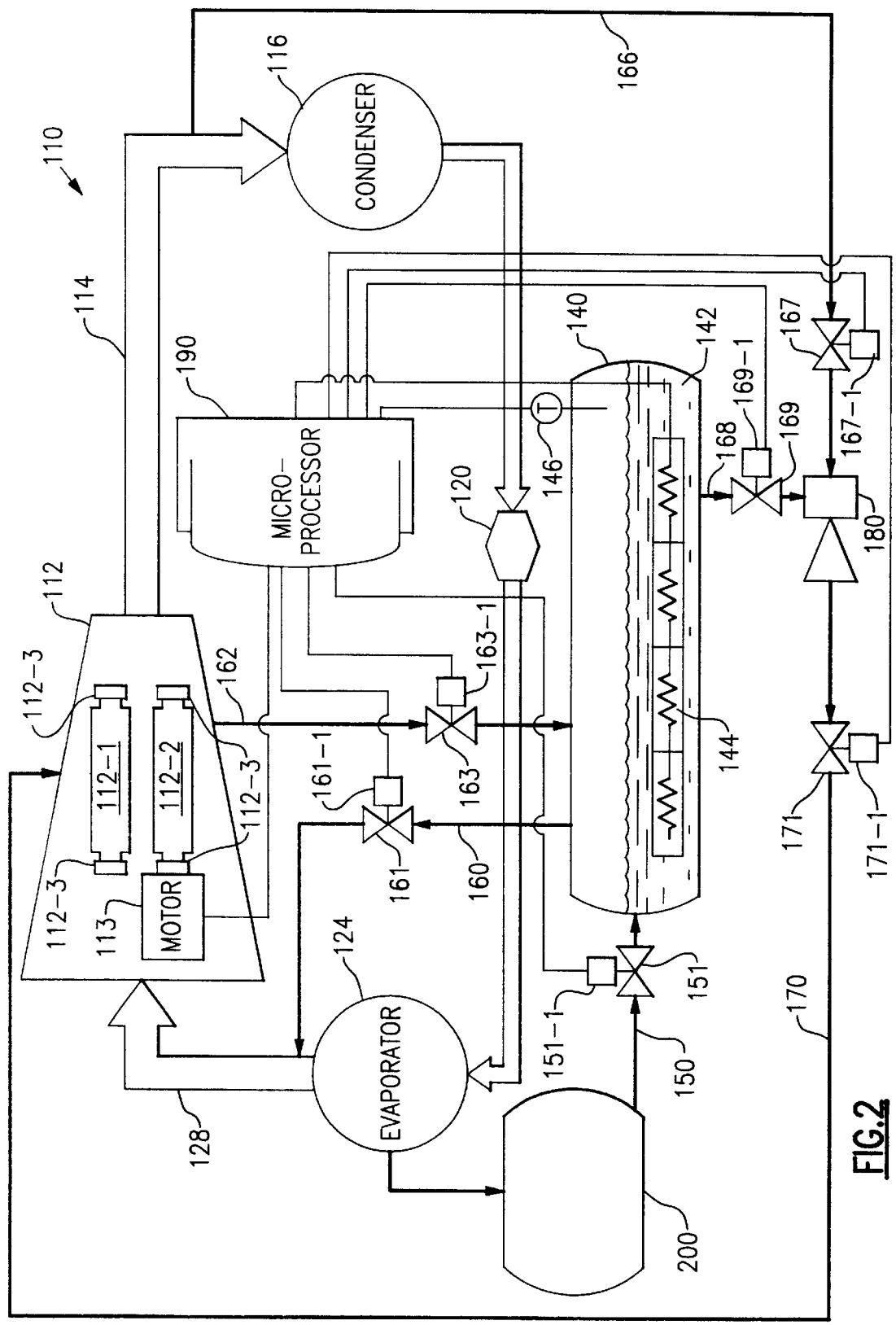
FIG. 2 is a schematic representation of a refrigeration system employing a second embodiment of the present invention.

In FIG. 2, the numeral 110 generally designates a refrigeration system which differs from refrigeration system 10 in the details of the lubrication system. Specifically, the lubrication system does not have an oil separator and employs a jet pump during periods of operation to deliver oil from reservoir 140 to compressor 112 rather than pressurizing the oil reservoir 140. Refrigeration system 110 includes a fluid circuit serially including screw compressor 112, discharge line 114, condenser 116, expansion device 120, evaporator 124 and suction line 128. Screw compressor 112 is driven by motor 113 under the control of microprocessor 190. Oil reservoir 140, which may or may not be the only oil reservoir, contains oil and refrigerant gas, or oil-rich solution, with the liquid portion labeled 142, of which at least a portion is used for pre-start lubrication of the bearings 112-3 of rotors 112-1 and 112-2 of compressor 112 and possibly of other components as well. During at least some portions of periods when system 110 is not operating, the contents of reservoir 140, including oil 142 is heated by electrical heater 144 under the control of microprocessor 190 responsive to the sensed temperature or pressure in oil reservoir 140 with temperature sensor 146 being illustrated.

During operation, oil reservoir 140 is at a pressure near that of evaporator 124, in contrast to reservoir 40 which is at a pressure near that of oil separator 15 and discharge line 14. Oil reservoir 140 is connected to the low pressure side of system 110 via gas vent line 160 containing solenoid valve 161 under control of microprocessor 190 through solenoid 161-1. Oil reservoir 140 is connected to an oil collector 200 via flow line 150 containing solenoid valve 151 controlled by microprocessor 190 through solenoid 151-1. Oil reservoir 140 is connected to compressor 112 via lubricant return line 162 containing solenoid valve 163 which is controlled by microprocessor 190 through solenoid 163-1. Oil reservoir 140 is connected to jet pump 180 via oil supply line 168 containing solenoid valve 169 under control of microprocessor 190 via solenoid 169-1.

During operation, oil-refrigerant mixture from evaporator 124 flows into collector 200, preferably due to gravity. If needed during operation, heat may be added in collector 200 to vaporize some liquid refrigerant, thereby creating a mixture with higher oil concentration. The oil rich solution is returned to oil reservoir 140 via line 150 since valve 151 is open during operation. Jet pump 180, driven by high pressure gas via line 166 containing solenoid valve 167 under control of microprocessor 190 via solenoid 167-1, draws a portion of lubricant 142 through oil supply line 168 since valves 167 and 169 are open during operation. Jet pump 180 mixes the drawn portion of lubricant 142 with refrigerant gas supplied through line 166 and delivers the mixture to compressor bearings 112-3 and possibly other components of compressor 112 via line 170 containing solenoid valve 171 under control of microprocessor 190 via solenoid 171-1, valve 171 being open during operation. After passing through the bearings and any other components, much of the lubricant is returned to reservoir 140 via lubricant return line 162 since valve 163 is open during operation. Some lubricant may leak, be entrained with refrigerant gas passing through compressor 112, and ultimately be returned to reservoir 140 after passing through discharge line 114, condenser 116 and expansion device 120, evaporator 124, collector 200 and flow line 150.

Now, when microprocessor 190 calls for end of operation of compressor 112 in response to either sensed parameters or manual input, just prior to interrupting power to motor 113 of compressor 112 or at least before substantial equalization of fluid pressure between condenser 116 and low pressure regions such as evaporator 124, valves 151, 161, 163 and 171 are closed, all under control of microprocessor 190. As a result, high pressure refrigerant gas passes from line 166 to reservoir 140 via line 168, raising the fluid pressure of the contents of reservoir 140. Then, with the closing of valve 169, the state of raised pressure is maintained in reservoir 140. Microprocessor 190 then interrupts power to motor 113 of compressor 112, shutting down system 110. As with reservoir 40, during the period of shut-down, heat transfer from reservoir 140 to its surroundings may result in a decrease in fluid pressure of contents 142. The manner in which this is countered using heater 144 under control of microprocessor 190 is identical to the manner used with reservoir 40. That is, the electric heater 144 is activated by microprocessor 190 delivering heat into the contents of reservoir 140 to replace heat lost to surroundings.

When start of operation of system 110 takes place, just prior to the start of operation, valve 167 is closed and valves 169 and 171 are opened by microprocessor 190. With valve 169 opened, lubricant 142 acted on by the pressure in reservoir 140 serially flows through line 168, jet pump 180, and line 170 which delivers lubricant to compressor bearings 112-3 and possibly other components. After a sufficient, pre-selected time has elapsed, which is sufficient for adequate pre-start lubrication to occur, microprocessor 190 powers motor 113 for driving compressor 112 and opens valves 151, 161, 163 and 167. According to the requirements of normal operation, power to the heater 144 can be discontinued or maintained, as required.

Although preferred embodiments of the present invention have been illustrated and described, other changes will occur to those skilled in the art. For example, although a screw compressor has been specifically disclosed, the present invention may be employed with other positive displacement compressors. It is therefore, intended that the scope of the present invention is to be limited only by the scope of the appended claims.

What is claimed is:

1. In a refrigeration system having a positive displacement compressor with components supported by bearings and a lubrication system which continuously receives lubricant from one portion of the refrigeration system and delivers lubricant to the bearings during compressor operation, a method of providing lubrication to the bearings prior to start up of the refrigeration system including the steps of:

fluidly isolating a portion of the lubrication system which continuously receives lubricant during compressor operation thereby trapping lubricant in a pressurized state as part of shutting down the refrigeration system; and as part of starting up the refrigeration system providing fluid communication between the isolated portion of the lubrication system containing pressurized lubricant and the bearings.

2. The method of claim 1 further including the step of heating the trapped lubricant whereby the trapped lubricant is kept in a pressurized state.

3. The method of claim 1 further including the step of pressurizing the portion of the lubrication system which is isolated as part of the step of fluidly isolating the portion of the lubrication system.

4. A refrigeration system including:

a positive displacement compressor having components supported by bearings;

lubrication means for continuously receiving lubricant from one portion of said refrigeration system and for delivering lubricant to said bearings during compressor operation;

said lubrication means including a housing continuously receiving lubricant during compressor operation;

means for fluidly isolating said housing when shutting down said refrigeration system;

means for pressurizing lubricant in said housing; and means for fluidly connecting said pressurized lubricant in said fluid isolated housing to said bearings prior to start up of said refrigeration system.

5. The refrigeration system of claim 4 further including means for maintaining said lubricant isolated in said housing in a pressurized state.

6. The refrigeration system of claim 5 wherein said means for maintaining said lubricant pressurized includes means for heating said isolated lubricant.

7. The refrigeration system of claim 4 further including means for supplying pressurized gas to said housing in conjunction with said means for fluidly isolating said housing whereby said housing is pressurized prior to being completely fluidly isolated.

8. The refrigeration system of claim 4 wherein said compressor is a screw compressor.

9. The refrigeration system of claim 4 wherein:

said housing is at low pressure relative to discharge pressure of said compressor during normal compressor operation; and said means for pressurizing lubricant in said housing includes means for supplying discharge pressure to said housing when said housing is otherwise fluidly isolated when shutting down.

\* \* \* \* \*